United States Patent
Hong et al.

(10) Patent No.: US 12,333,014 B2
(45) Date of Patent: Jun. 17, 2025

(54) STORAGE DEVICE AND OPERATION METHOD THEREOF

(71) Applicant: SAMSUNG ELECTRONICS CO., LTD., Suwon-si (KR)

(72) Inventors: Yuri Hong, Suwon-si (KR); Kyung-Woo Noh, Suwon-si (KR); Byungchan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 18/146,363

(22) Filed: Dec. 24, 2022

(65) Prior Publication Data

US 2023/0281312 A1  Sep. 7, 2023

(30) Foreign Application Priority Data

Mar. 7, 2022 (KR) .......... 10-2022-0028948
May 31, 2022 (KR) .......... 10-2022-0066817

(51) Int. Cl.
*G06F 21/57* (2013.01)
*G06F 21/60* (2013.01)
*G06F 21/64* (2013.01)

(52) U.S. Cl.
CPC .......... *G06F 21/572* (2013.01); *G06F 21/602* (2013.01); *G06F 21/64* (2013.01)

(58) Field of Classification Search
CPC ....... G06F 21/572; G06F 21/602; G06F 21/64
See application file for complete search history.

(56) References Cited

U.S. PATENT DOCUMENTS

| | | | | |
|---|---|---|---|---|
| 9,626,513 | B1* | 4/2017 | Aytek | G06F 8/654 |
| 10,142,104 | B2* | 11/2018 | De Atley | H04L 9/302 |
| 10,587,421 | B2* | 3/2020 | Hojsik | H04L 9/3271 |
| 10,771,264 | B2* | 9/2020 | Edwards | G06F 21/572 |
| 10,887,770 | B2* | 1/2021 | Choi | H04W 12/10 |
| 11,093,321 | B1* | 8/2021 | Zeavelou | G06F 11/0793 |
| 2006/0010326 | A1* | 1/2006 | Bade | G06F 21/572 |
| | | | | 713/176 |
| 2010/0064048 | A1* | 3/2010 | Hoggan | G06F 21/575 |
| | | | | 709/229 |
| 2014/0108786 | A1* | 4/2014 | Kreft | G06Q 20/3825 |
| | | | | 713/194 |

(Continued)

FOREIGN PATENT DOCUMENTS

KR  2289456  8/2021

*Primary Examiner* — J. Brant Murphy
(74) *Attorney, Agent, or Firm* — MORGAN, LEWIS & BOCKIUS LLP

(57) ABSTRACT

A storage device includes a memory that includes a firmware image area, and a memory controller that receives a first firmware image that includes a firmware signature, firmware data, a first certificate that includes a first certificate public key, and a second certificate that includes a second certificate public key. The memory controller verifies the first certificate using the second certificate public key, compares a hash value of the firmware data with the firmware fingerprint when the first certificate is verified, verifies the firmware signature using the first certificate public key when the hash value of the firmware data matches the firmware fingerprint, and stores the first firmware image in a firmware image area when the firmware signature is verified.

20 Claims, 9 Drawing Sheets

(56) References Cited

U.S. PATENT DOCUMENTS

| | | | |
|---|---|---|---|
| 2015/0199517 A1* | 7/2015 | Rose | G06F 21/562 |
| | | | 726/22 |
| 2018/0034682 A1* | 2/2018 | Gulati | G09C 1/00 |
| 2018/0041341 A1* | 2/2018 | Gulati | H04L 9/0894 |
| 2018/0097639 A1* | 4/2018 | Gulati | G09C 1/00 |
| 2019/0356529 A1* | 11/2019 | Gulati | H04L 9/3242 |
| 2020/0074086 A1* | 3/2020 | Bulygin | G06F 21/572 |
| 2021/0248238 A1 | 8/2021 | Chen | |
| 2022/0179960 A1* | 6/2022 | Spangler | G06F 21/572 |
| 2023/0134324 A1* | 5/2023 | Emerson | G06F 21/602 |
| | | | 726/26 |
| 2023/0246827 A1* | 8/2023 | Luciani, Jr. | G06F 21/575 |
| | | | 713/189 |

* cited by examiner

STORAGE DEVICE AND OPERATION METHOD THEREOF

CROSS-REFERENCE TO RELATED APPLICATION

This application claims priority under 35 U.S.C. 119 from Korean Patent Application No. 10-2022-0028948, filed in the Korean Intellectual Property Office on Mar. 7, 2022, and Korean Patent Application No. 10-2022-0066817, filed in the Korean Intellectual Property Office on May 31, 2022, the contents of both of which are herein incorporated by reference in their entireties.

TECHNICAL FIELD

Embodiments of the disclosure are directed to a storage device and a method of operating the same.

DISCUSSION OF THE RELATED ART

A storage device can be driven by firmware. The firmware can be stored in a read only memory (ROM) of the storage device. The firmware may be modified or updated.

When the storage device receives an updated firmware image from a host, the storage device verifies whether the received firmware image is valid. When the firmware image is valid, the storage device performs an update using the corresponding firmware image. The storage device verifies whether the firmware image is valid by verifying a firmware signature by using a public key indicated by a value stored in a one-time programmable (OTP) memory of several public keys stored in the ROM of the storage device.

SUMMARY

An embodiment provides a storage device that verifies a firmware image without updating an OTP memory even though a secret key used to generate a firmware signature has leaked, and an operation method thereof.

A storage device according to an embodiment includes: a memory that includes a firmware image area; and a memory controller that receives a first firmware image that includes a firmware signature, firmware data, a first certificate that includes a first certificate public key and a firmware fingerprint, and a second certificate that includes a second certificate public key, verifies the first certificate using the second certificate public key, compares a hash value of the firmware data with the firmware fingerprint when the first certificate is verified, verifies the firmware signature using the first certificate public key when the hash value of the firmware data matches the firmware fingerprint, and stores the first firmware image in a firmware image area when the firmware signature is verified.

The memory controller may determine that the first firmware image has been manipulated when the hash value of the firmware data does not match the firmware fingerprint.

The firmware image area may store a second firmware image of the storage device, the second firmware image and the first firmware image each may contain firmware key version information, and the memory controller may compare the hash value of the firmware data of the first firmware image with the firmware fingerprint of the first firmware image when a firmware key version of the first firmware image is greater than or equal to a firmware key version of the second firmware image.

The memory controller may determine that a version of the first firmware image is lower than a version of the second firmware image when the firmware key version of the first firmware image is lower than the firmware key version of the second firmware image.

The memory controller may compare the firmware key version of each of the second firmware image and the first firmware image when the first certificate is verified.

The storage device may further include a ROM that stores a public key, and the memory controller may verify the second certificate using the public key stored in the ROM, and may verify the first certificate when the second certificate is verified.

The first certificate may include a signature of the first certificate, the second certificate may include a signature of the second certificate, and the signature of the first certificate and the signature of the second certificate may be generated with a same private key.

The memory controller may verify the signature of the second certificate using the public key stored in the ROM.

The memory controller may verify the signature of the first certificate using a public key of the second certificate.

A method of updating firmware of a storage device according to an embodiment includes: receiving from a host a first firmware image that includes a firmware signature, firmware data, and a first certificate that includes a first certificate public key and a firmware fingerprint; obtaining a hash value by applying a hash function to the firmware data; comparing whether the hash value matches the firmware fingerprint; verifying the firmware signature using the first certificate public key when the hash value of the firmware data matches the firmware fingerprint; and storing the first firmware image in a firmware image area when the firmware signature is verified.

The method may further include determining that the first firmware image has been manipulated when the hash value of the firmware data does not match the firmware fingerprint.

The method may further include comparing a firmware key version of the first firmware image with a firmware key version of a second firmware image stored in the firmware image area of the storage device. Obtaining the hash value may be performed when the firmware key version of the first firmware image is higher than a firmware key version of the second firmware image.

The method may further include determining that the firmware key version of the first firmware image is lower than the firmware key version of the second firmware image when the firmware key version of the first firmware image is lower than the firmware key version of the second firmware image.

The first firmware image may further include a second certificate that includes a second certificate public key, and the method may further include verifying the first certificate using the second certificate public key. Comparing the firmware key version of the first firmware image with the firmware key version of the second firmware image is performed when the first certificate is verified.

The method may further include verifying the second certificate using a public key stored in a ROM of the storage device, and verifying the first certificate may be performed when the second certificate is verified.

The first certificate may include a signature of the first certificate, the second certificate may include a signature of the second certificate, and the signature of the first certificate and the signature of the second certificate may be generated with a same private key.

Verifying the second certificate may include verifying the signature of the second certificate using a public key stored in the ROM.

Verifying the first certificate may include verifying the signature of the first certificate using the second certificate public key.

A storage device according to an embodiment includes: a plurality of memory systems; and a controller that controls the plurality of memory systems, receives a firmware image that includes firmware data and a firmware fingerprint from a host through a signal connector, and reports to the host that the firmware image has been manipulated when a hash value of the firmware data does not match the firmware fingerprint.

The firmware image may include a signature of a certificate based on the firmware fingerprint, and the controller reports to the host that the firmware image has been manipulated when a hash value of the firmware fingerprint does not match a hash value of a decrypted signature of the certificate.

DETAILED DESCRIPTION

Figure 1:
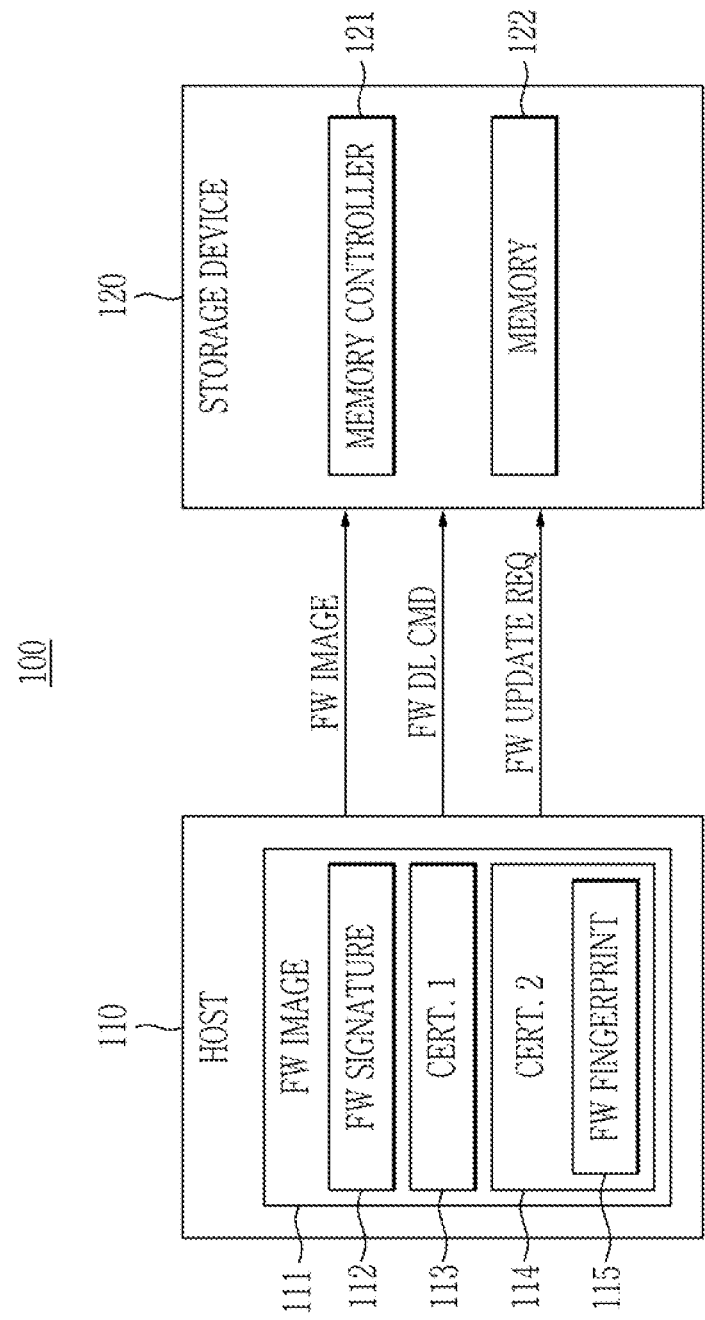
FIG. 1 is a block diagram of a storage system according to an embodiment.

In the drawings, like reference numerals may designate like elements throughout the specification. In the flowcharts, the order of operations may change, several operations may be merged, some operations may be divided, and specific operations may not be performed.

FIG. 1 is a block diagram of a storage system according to an embodiment.

Referring to FIG. 1, in an embodiment, a storage system 100 includes a host 110 and a storage device 120.

The host 110 can transfer firmware to the storage device 120. The storage device 120 controls hardware in the storage device 120 or the storage device 120, based on the received firmware. When firmware is already present in the storage device 120 and an updated version of the existing firmware has been received, the storage device 120 updates the firmware with the newly received firmware.

For example, the host 110 transmits to the storage device 120 a firmware image download request (FW UPDATE REQ) or a firmware image download command (FW DL CMD) together with a firmware image (FW IMAGE) to be downloaded.

For another example, the host 110 stores the firmware image download command in a submission queue of the host 110. For example, information of a firmware image 111 is stored together with the firmware image download command in the submission queue. The storage device 120 acquires the firmware image 111 based on the information stored in the submission queue. The host 110 can transmit the firmware image 111 to the storage device 120 by various methods, and the transmission method is not limited to any one method.

The host 110 transmits a firmware update request for the transmitted firmware image 111 to the storage device 120.

The firmware is in the form of an image. Therefore, the firmware provided by the host 110 to the storage device 120 is referred to as a firmware image 111. The firmware image 111 contains a firmware signature 112. In some embodiments, the firmware signature 112 is generated using the firmware image 111 and a private key of a manufacturer. The firmware image 111 includes a plurality of certificates 113 and 114. In some embodiments, a plurality of certificates 113 and 114 each contain a signature generated with the same private key. One of the plurality of certificates 113 and 114 contains a public key for the firmware signature 112. One of the plurality of certificates 113 and 114 includes a public key that can verify the other of the plurality of certificates 113 and 114. The firmware image 111 includes a firmware fingerprint 115. In some embodiments, one of the plurality of certificates 113 and 114 includes the firmware fingerprint 115. The firmware fingerprint 115 contains a hash value of the firmware binary.

The storage device 120 includes a memory controller 121 and a memory 122.

The memory controller 121 verifies the firmware image 111 received from the host 110. The memory controller 121 performs an integrity check or a validation. Examples of the integrity check include a checksum method, a hash function method, an electronic signature method, or a message authentication code (MAC) method, and the type of verification is not limited thereto. In some embodiments, the memory controller 121 completes verification of the plurality of certificates 113 and 114, and verifies the firmware signature 112 of the firmware image 111 by using the public key for the firmware signature 112 that is contained in one of the plurality of certificates 113 and 114. In some embodiments, the memory controller 121 verifies whether the firmware image 111 has been arbitrarily manipulated using the fingerprint 115. For example, the memory controller 121 generates a binary hash value of the firmware image 111 and compares it with the firmware fingerprint 115 to verify the firmware image 111.

The memory controller 121 stores the verified firmware image 111 in the memory 122 according to the firmware update request. When the verification of the firmware signature 112 is completed, the memory controller 121 updates the firmware image 111.

The storage device 120 include storage media that stores data according to a request from the host 110. For example, the storage device 120 includes at least one solid state drive (SSD). When the storage device 120 includes an SSD, the memory 122 includes a plurality of flash memory chips, such as NAND memory chips, for nonvolatile storage of data. For example, the memory 122 corresponds to one flash memory device, or the memory 122 includes a memory card that includes at least one flash memory chip.

When the storage device 120 includes a flash memory, the flash memory may include a 2D NAND memory array or a 3D (or vertical) NAND (VNAND) memory array. A 3D memory array is an array of memory cells having an active area disposed on a silicon substrate, or a circuit related to the operation of memory cells, formed monolithically in at least one physical level of a circuit formed on or within the substrate. The term "monolithic" means that a layer of each level of the array is stacked directly on top of the layers of each lower level of the array. A 3D memory array includes vertical NAND strings disposed in a vertical direction such that at least one memory cell is positioned on top of another memory cell. At least one memory cell includes a charge trap layer.

For example, the storage device 120 includes various other types of memories. For example, the storage device 120 includes a nonvolatile memory, such as a magnetic RAM (MRAM), a spin-transfer torque MRAM, a conductive bridging RAM (CBRAM), a ferroelectric RAM (FeRAM), a phase RAM (PRAM), a resistive RAM, a nanotube RAM, a polymer RAM (PoRAM), a nano-floating gate memory (NFGM), a holographic memory, a molecular electronics memory device, or an insulator resistance change memory, etc.

The memory 122 may be an embedded Multi-Media Card (eMMC) or an embedded universal flash storage (UFS) memory device. For example, the memory 122 is an external memory that is detachable from the storage device 120. For example, the memory 122 is one of a UFS memory card, a compact flash (CF), a secure digital (SD), a micro-secure digital (SD), a mini-SD, an extreme digital (xD), or a memory stick, but is not limited thereto.

The host 110 communicates with the storage device 120 through one of various interfaces. For example, the host 110 communicates with the storage device 120 through one of various interfaces, such as a universal serial bus (USB), a multimedia card (MMC), a PCI express (PCI-E), an AT attachment (ATA), a serial AT attachment (SATA), a parallel AT attachment (PATA), a small computer system interface (SCSI), a serial attached SCSI (SAS), an enhanced small disk interface (ESDI), an integrated drive electronics (IDE), or a non-volatile memory express (NVMe), etc.

Figure 2:
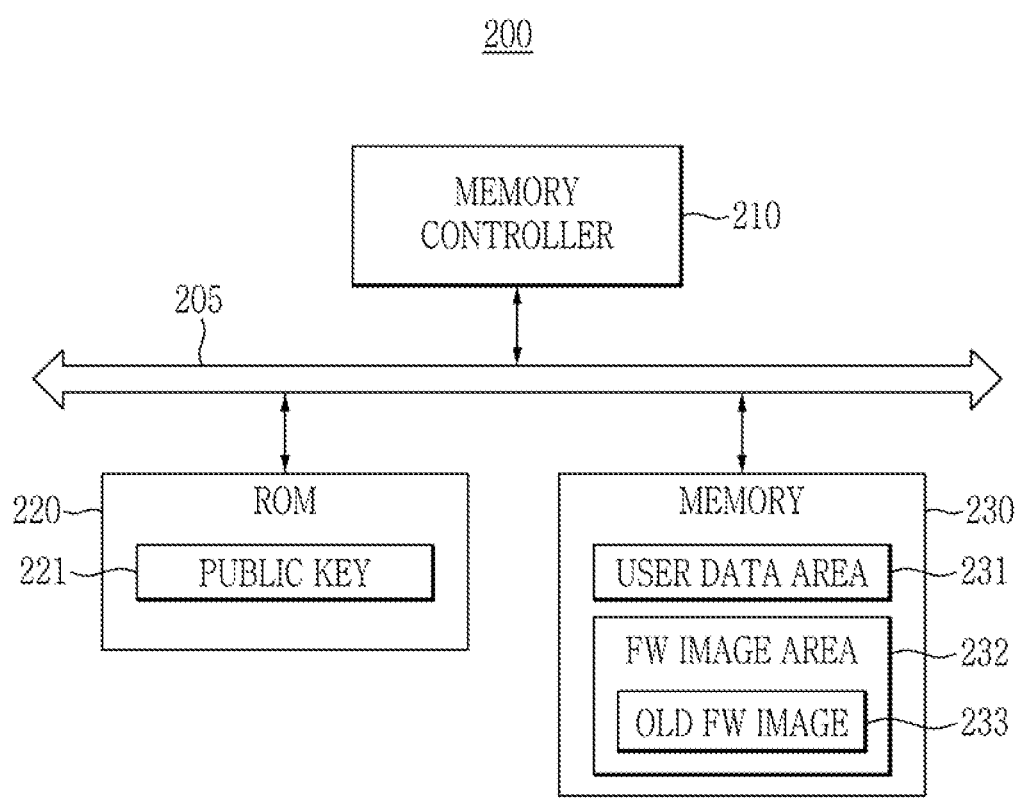
FIG. 2 is a block diagram of a storage device according to an embodiment.

FIG. 2 is a block diagram of a storage device according to an embodiment.

Referring to FIG. 2, in an embodiment, the storage device 200 includes a system bus 205, a memory controller 210, a ROM 220, and a memory 230.

The memory controller 210 controls the overall operation of the ROM 220 and the memory 230. For example, the memory controller 210 receives data, an address, and a command from the host, and controls the operation of the memory 230 in response thereto.

The ROM 220 includes a public key 221. The public key 221 is stored in the ROM 220 during the manufacturing process of the storage device 200.

The memory 230 includes a user data area 231 and a firmware image area 232. The user data area 231 is accessible by the host. For example, the user data area 231 is where data are written and read by the memory controller 210 according to a read or write command received from the host. For example, the user data area 231 includes most areas in which data is written and stored in the memory 230.

The firmware image area 232 is where access by the host is restricted. The firmware image area 232 stores a firmware image 233. The firmware image 233 is stored in the firmware image area 232 during the manufacturing process of the storage device 200. Alternatively, a new firmware image is stored in the firmware image area 232 by a firmware update after the storage device 200 is released.

The memory 230 includes a non-volatile memory. The memory 230 includes, for example, one or more of a NAND flash memory, a vertical NAND flash memory (vertical NAND: VNAND, 3D), a NOR flash memory, a phase-change random access memory (PRAM), a resistive random access memory (RRAM), a magnetoresistive random access memory (MRAM), a ferroelectric random access memory (FRAM), a spin transfer torque random access memory (STT-RAM), or a similar non-volatile memory device. However, embodiments are not necessarily limited thereto.

The system bus 205 connects the memory controller 210, the ROM 220, and the memory 230.

Figure 3:
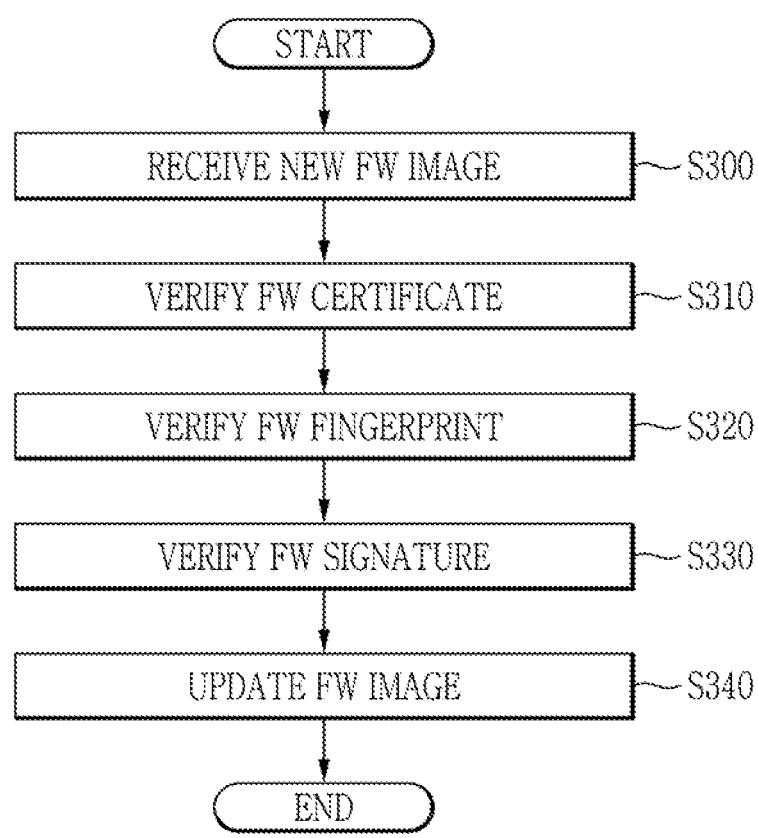
FIG. 3 is a flowchart of an operating method of a storage device according to an embodiment.

FIG. 3 is a flowchart of an operating method of a storage device according to an embodiment.

Referring to FIG. 2 and to FIG. 3, in an embodiment, the memory controller 210 receives the firmware image download command and the firmware image to be downloaded from the host (S300).

The memory controller 210 verifies a certificate in the received firmware image (S310). In some embodiments, the memory controller 210 verifies the certificate in the firmware image with the public key 221 stored in the ROM 220. When the certificate is successfully verified, the memory controller 210 obtains a public key from the verified certificate that verifies a firmware signature.

The memory controller 210 verifies a firmware fingerprint in the firmware image (S320). In some embodiments, the memory controller 210 generates a hash value for a firmware binary code of the firmware image. The memory controller 210 verifies the firmware fingerprint by comparing the generated hash value with the firmware fingerprint.

The memory controller 210 verifies the firmware signature in the received firmware image (S330). In some embodiment, the memory controller 210 verifies the firmware signature using the public key obtained in S310.

When the memory controller 210 fails to verify the firmware fingerprint, it determines that the firmware image has been manipulated. In addition, the memory controller 210 reports to the host that the firmware image has been manipulated. Then, the host reports to a manufacturer that the firmware image has been manipulated and that a secret key used for the firmware signature of the firmware image has leaked.

When the verification of the firmware signature is completed, the memory controller 210 updates the firmware image (S340). For example, when verification of the firmware signature is successful, the memory controller 210 stores the verified firmware image in the firmware image area 232 of the memory 230 and updates the firmware of the storage device 200 with the received firmware image. For another example, when verification of the firmware signature fails, the memory controller 210 does not store the firmware image in the memory 230.

Figure 4:
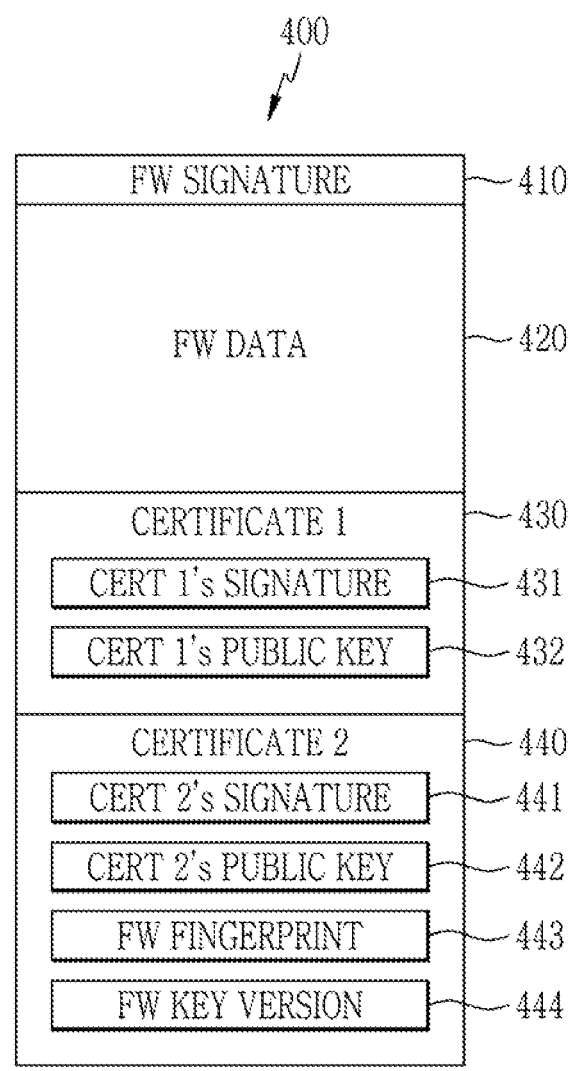
FIG. 4 is a block diagram of firmware of a storage device according to an embodiment.

FIG. 4 is a block diagram of firmware of a storage device according to an embodiment.

Referring to FIG. 4, in an embodiment, a firmware image 400 includes a firmware signature 410, firmware data 420, and a plurality of certificates 430 and 440.

The firmware signature 410 contains information that performs verification of the firmware image 400. The firmware signature 410 includes different information according to a digital signature algorithm (DSA) applied to the firmware image 400. The digital signature algorithm generates a signature using a private key known only to the given data. A third party can confirm that the data was created from the verified party through signature verification that uses the public key. For example, when an authentication according to the RSA (Rivest Shamir Adleman) algorithm is performed for the firmware image 400, the result of signing a hash value obtained by applying a hash function to the firmware data 420 with a secret key is included in the firmware signature 410. The firmware signature 410 can be verified with a public key that is included in one of the plurality of certificates 430 and 440.

The firmware data 420 contains a firmware program code.

A first certificate 430 includes a first certificate signature 431 and a first certificate public key 432. The first certificate signature 431 includes a result signed by the manufacturer's private key. The first certificate signature 431 is verified with the public key stored in the ROM of the storage device. The first certificate 430 is a root to trust (RoT), and by verifying the first certificate signature 431, the storage device can verify whether the first certificate 430 is a trusted certificate generated by the manufacturer's private key.

A second certificate 440 includes a second certificate signature 441, a second certificate public key 442, a firmware fingerprint 443, and firmware key version information 444. The second certificate signature 441 includes the result signed by the manufacturer's private key. The second certificate signature 441 can be verified with the second certificate public key 442.

The firmware fingerprint 443 contains a binary hash value of the firmware data 420. In some embodiments, the firmware fingerprint 443 includes a hash value calculated by applying a hash function to the binary of the firmware data 420.

The firmware key version information 444 includes version information of a secret key used to generate the firmware signature 410 when the firmware image 400 is generated. When the secret key used to generate the firmware signature 410 has leaked, the firmware signature 410 is generated as a new secret key by the manufacturer, and the version of the secret key changes.

Figure 5:
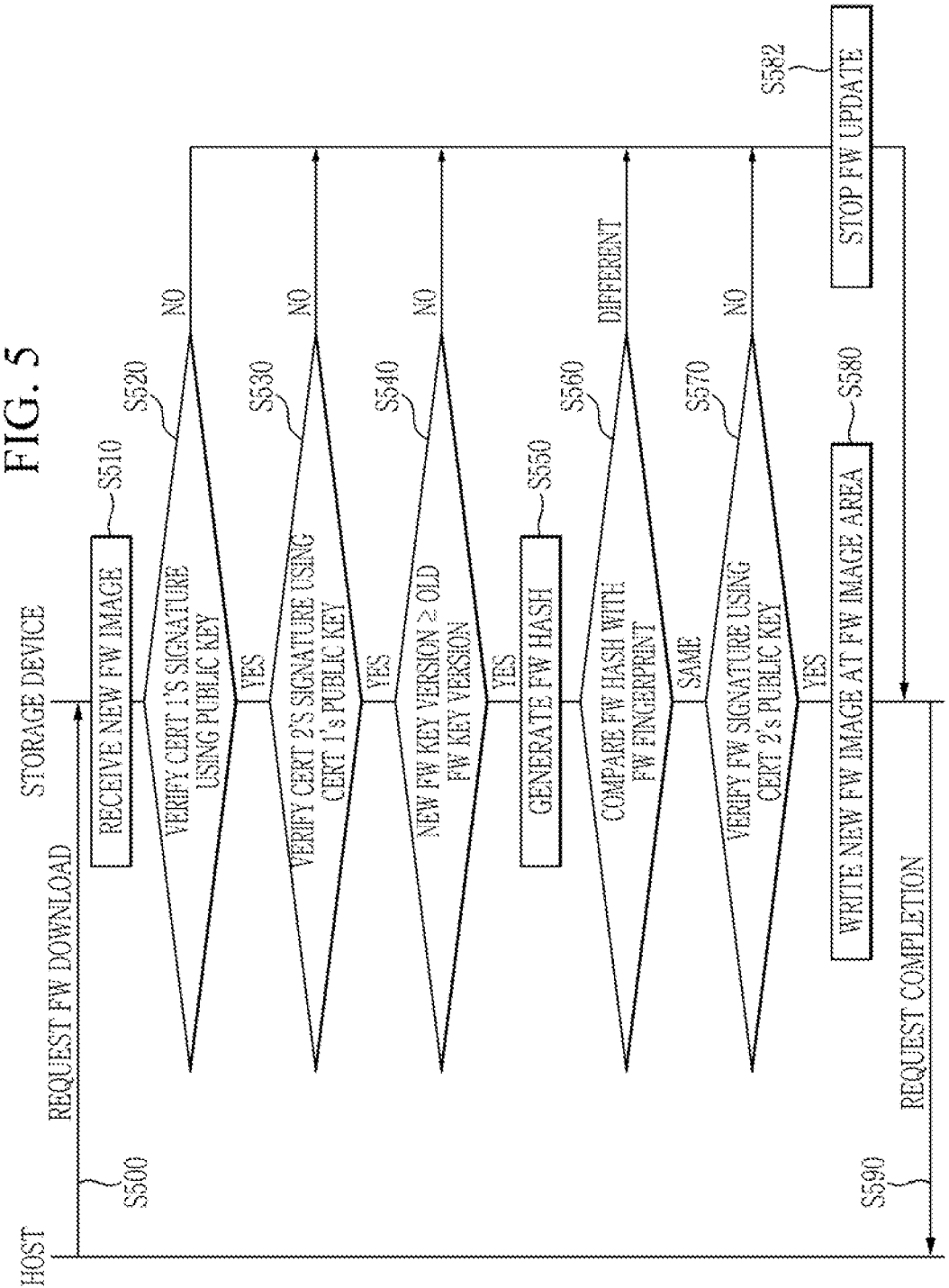
FIG. 5 is a flowchart of an operating method of a storage system according to an embodiment.

FIG. 5 is a flowchart of an operating method of the storage system according to an embodiment.

Referring to FIG. 5, in an embodiment, the host transmits a firmware image download request to the storage device (S500). The host transmits the image download command and the firmware image to be downloaded to the storage device.

The storage device receives the new firmware image from the host (S510). The storage device stores the new firmware image in a region of memory.

The memory controller of the storage device verifies the signature of the first certificate of the received firmware image using the public key stored in the ROM (S520).

When verification of the signature of the first certificate is successful, the memory controller of the storage device verifies the signature of the second certificate of the received firmware image using the public key of the first certificate included in the first certificate (S530). The memory controller of the storage device determines whether the hash value of the data, such as a firmware fingerprint, firmware key version information, and a firmware signature, included in the second certificate matches the hash value obtained by decrypting the signature of the second certificate using the public key of the first certificate. When the secret key that signed the second certificate has not leaked but the firmware fingerprint has been manipulated, the hash value of the data in the second certificate does not match the hash value of the decrypted signature of the second certificate, and therefore the verification of the signature of the second certificate fails.

When the verification of the signature of the second certificate is successful, the memory controller of the storage device determines whether the key version of the new firmware is a higher version than the old firmware key version (S540).

When the key version of the new firmware is a higher version than the old firmware key version, the memory controller of the storage device generates a hash value for the binary of the firmware data of the received firmware image (S550).

The memory controller of the storage device compares the hash value with the firmware fingerprint of the received firmware image (S560).

When the hash value and the firmware fingerprint of the received firmware image are the same, the memory controller of the storage device verifies the firmware signature of the received firmware image using the public key of the second certificate in the second certificate (S570).

When verification of the firmware signature is successful, the memory controller of the storage device writes the received firmware image to the firmware image area and performs the update (S580).

When the verification of the signature of the first certificate fails in S520, when the verification of the signature of the second certificate fails in S530, when the key version of the new firmware is less than the old firmware key version in S560, when the hash value differs from the received firmware fingerprint of the received firmware image in S560, or when verification of the firmware signature fails in S570, the memory controller of the storage device stops updating the firmware (S582).

In S540, when the key version of the new firmware is lower than the old firmware key version, the memory controller of the storage device determines that the version of the firmware image in the host is lower than the version of the firmware image stored in the storage device, and reports it to the host.

When the hash value differs from the received firmware fingerprint image in S560, the memory controller of the storage device reports to the host that the firmware image has been manipulated. The host reports to the manufacturer that the firmware image has been modulated and that the secret key used for the firmware signature of the firmware image has leaked.

In response to the firmware download request, the memory controller of the storage device transmits a completion indication that indicates the success or failure of the firmware update to the host (S590).

Figure 6:
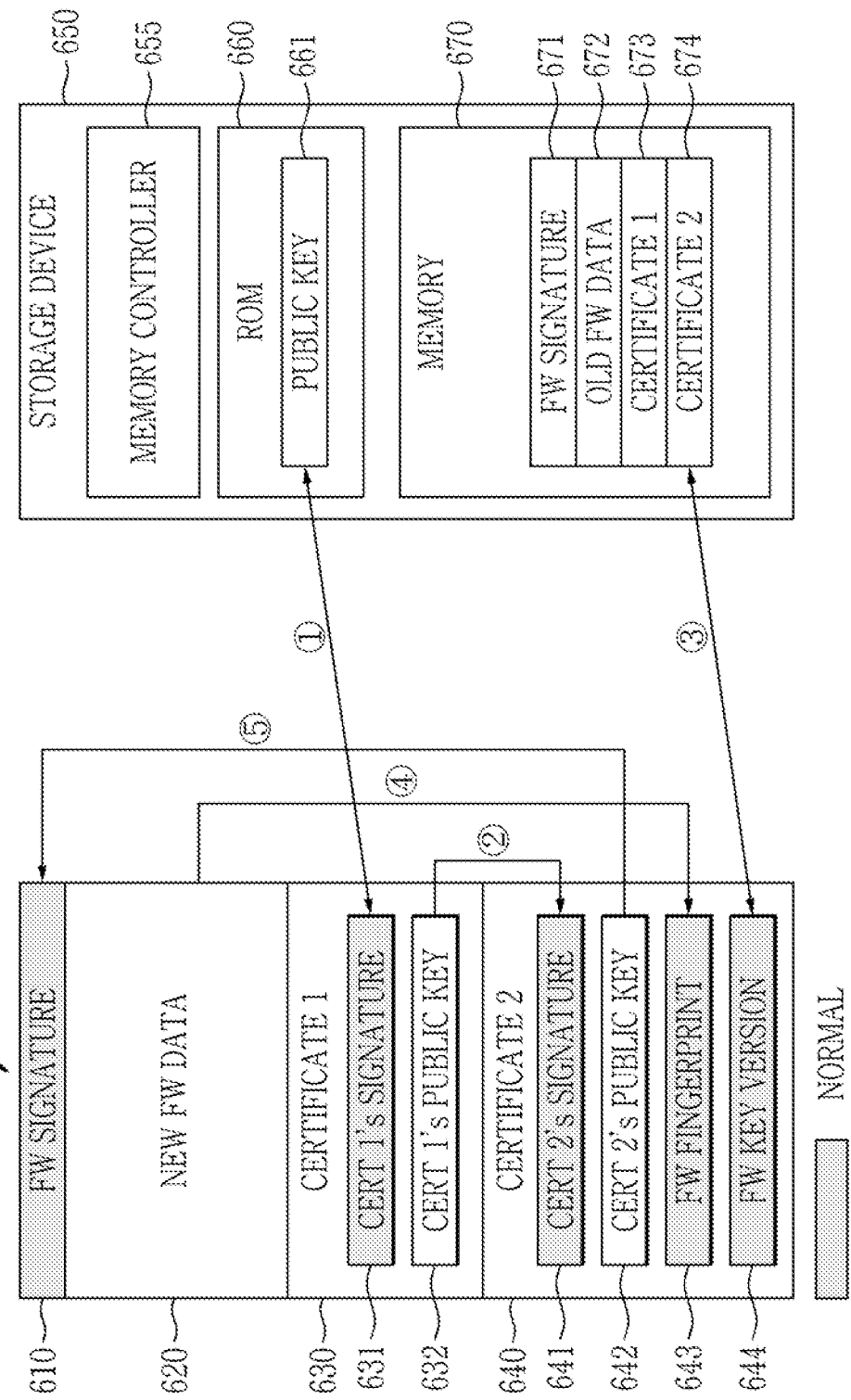
FIG. 6 to FIG. 8 illustrate an operation of a memory controller according to an embodiment.
Figure 7:
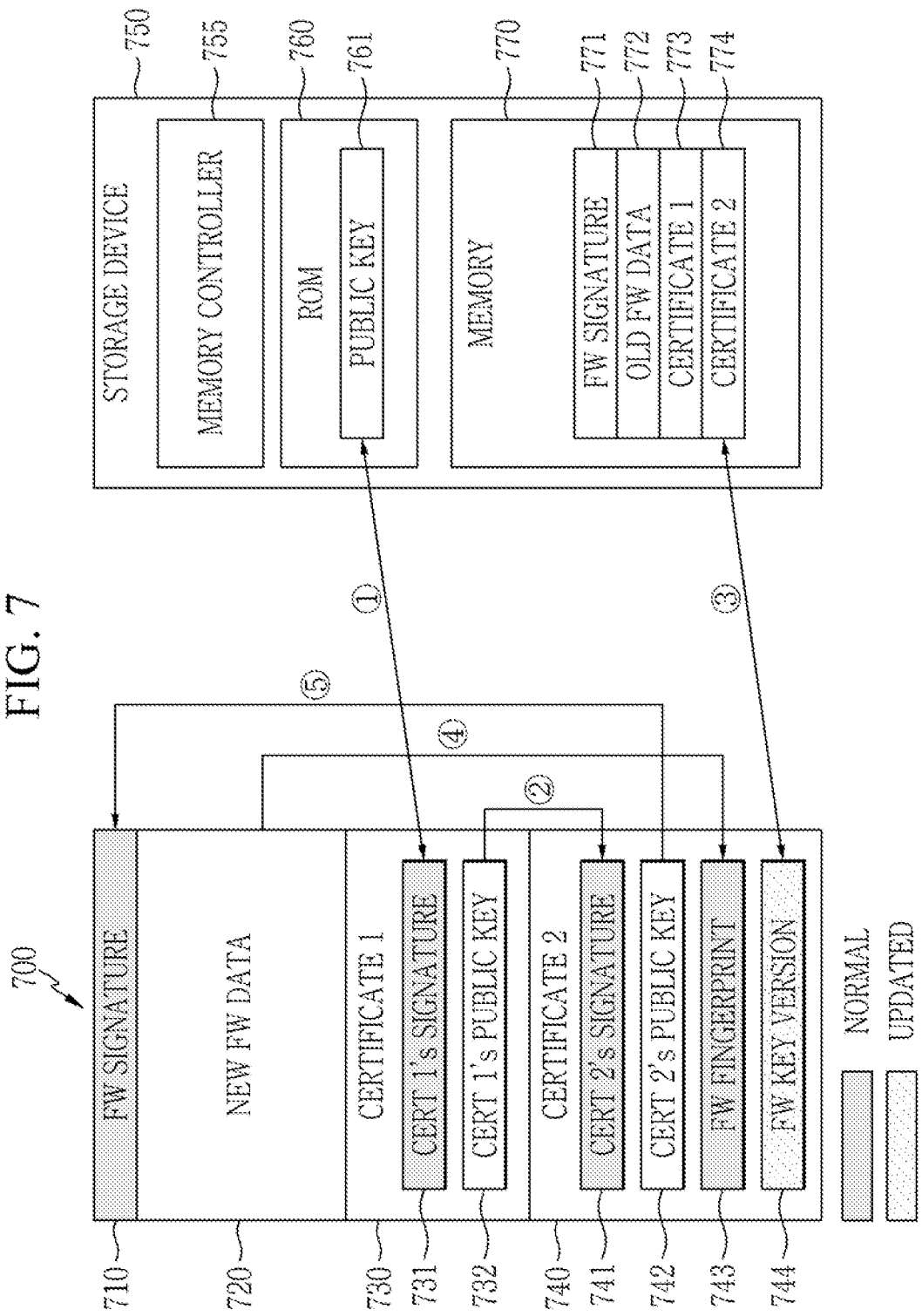
Figure 8:
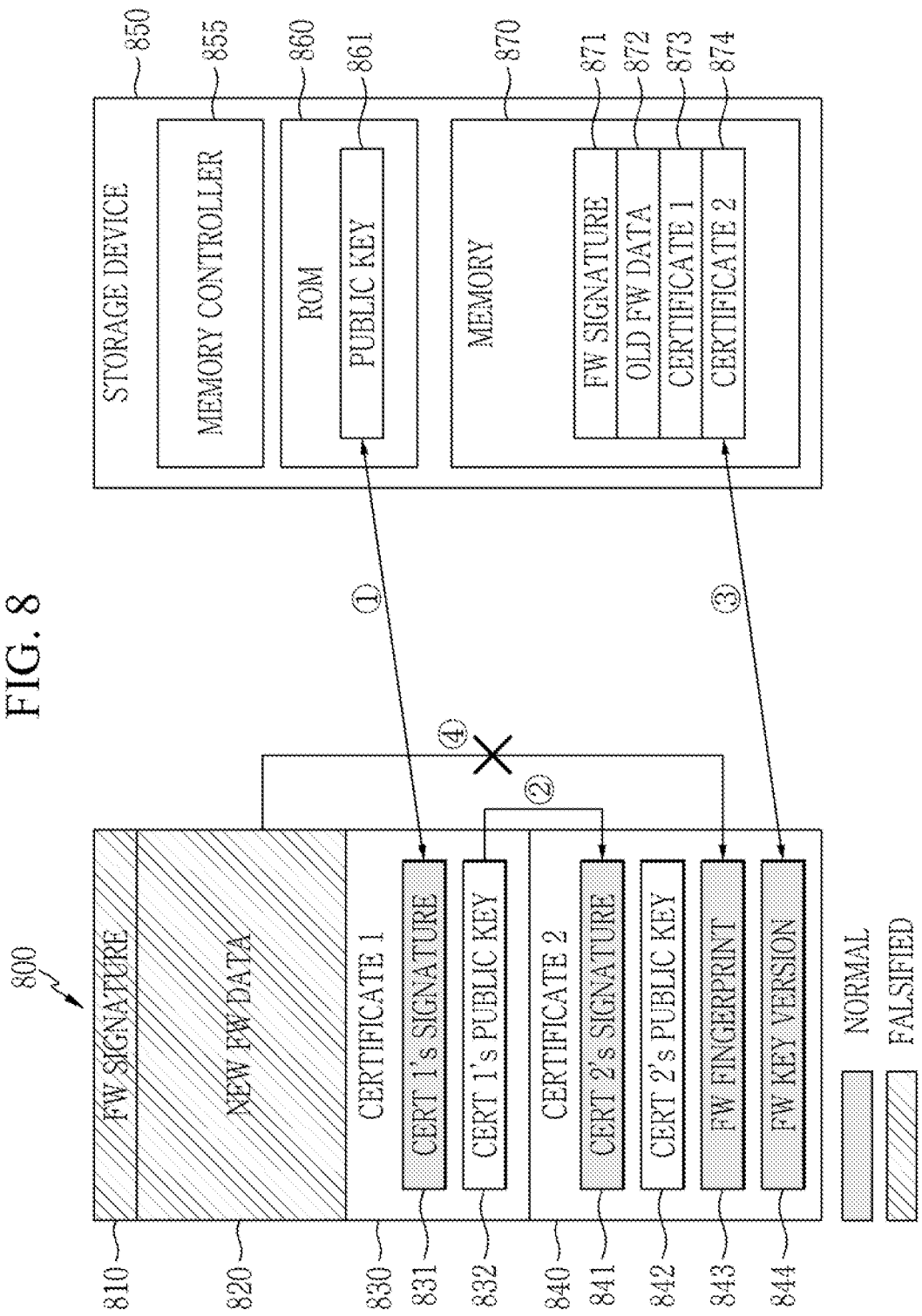

FIG. 6 to FIG. 8 illustrate an operation of a memory controller according to an embodiment.

FIG. 6 illustrates an update of a general firmware image. Referring to FIG. 6, in an embodiment, a storage device 650 receives a normal firmware image 600 and performs a firmware image update. The normal firmware image 600 is a manufactured image in which a secret key that generated a firmware signature 610 has not leaked. Therefore, a firmware key version 644 of a new firmware image 600 has not changed.

A memory controller 655 verifies a signature 631 of a first certificate 630 using a public key 661 stored in a ROM 660 (①).

When the signature 631 of the first certificate 630 is verified, the memory controller 655 verifies a signature 641 of a second certificate using a public key 632 of the first certificate 630 (②).

When the signature 641 of the second certificate 640 is verified, the memory controller 655 compares a firmware key version stored in the second certificate 674 of the firmware image stored in the memory 670 with the firmware key version 644 of the new firmware image 600 (③).

Since the firmware key version 644 of the new firmware image 600 is the same as the firmware key version stored in the second certificate 674 of the firmware image stored in memory 670, the memory controller 655 generates a hash value for the binary of the firmware data 620 and compares it with the firmware fingerprint 643 ( ).

Since the hash value is the same as the firmware fingerprint 643, the memory controller 655 verifies the firmware signature 610 using the public key 642 of the second certificate 640 ( ).

FIG. 7 illustrates the update of a firmware image that has updated the secret key after the secret key that generated the firmware signature has leaked. Referring to FIG. 7, in an embodiment, a storage device 750 receives a firmware image 700 updated with the secret key and performs a firmware image update. A firmware key version 744 of the new firmware image 700 has been updated.

The memory controller 755 verifies a signature 731 of a first certificate 730 using a public key 761 stored in a ROM 760 ( ).

When the signature 731 of the first certificate 730 is verified, the memory controller 755 verifies a signature 741 of a second certificate 740 using a public key 732 of the first certificate 730 ( ).

When the signature 741 of the second certificate 740 is verified, the memory controller 755 compares a firmware key version stored in the second certificate 774 of the firmware image stored in the memory 770 with a firmware key version 744 of the new firmware image 700 ( ).

Since the firmware key version 744 of the new firmware image 700 is higher than the firmware key version stored in the second certificate 774 of the firmware image stored in memory 770, the memory controller 755 generates a hash value for the binary of the firmware data 720 and compares it with the firmware fingerprint 743 ( ).

Since the hash value is the same as the firmware fingerprint 743, the memory controller 755 verifies the firmware signature 710 using the public key 742 of the second certificate 740 ( ).

FIG. 8 illustrates the update of a firmware image with a maliciously modulated firmware signature when a secret key that generated the firmware signature has leaked. Referring to FIG. 8, in an embodiment, a storage device 850 receives a firmware image 800 with a maliciously manipulated firmware signature 810. However, the storage device 850 does not perform a firmware image update through a firmware image verification. The firmware image 800 includes a firmware signature 810 and firmware data 820 that have been manipulated.

A secret key used for firmware signature 810 has leaked, and in this case, the firmware signature 810 and the firmware data 820 have been manipulated. However, since a secret key used to generate the first certificate 830 and the second certificate 840, that is, the secret key of the first certificate 830, has not leaked, the first certificate 830 and the second certificate 840 cannot be manipulated. Therefore, a firmware fingerprint 843 and information 844 on the firmware key version in the first certificate 830 and second certificate 840 cannot be manipulated. Therefore, the manipulated firmware image 800 includes a manipulated firmware signature 810 and manipulated firmware data 820, and a normal first certificate 830 and a normal second certificate 840.

The memory controller 855 verifies a signature 831 of the first certificate 830 using a public key 861 stored in a ROM 860 ( ).

When the signature 831 of the first certificate 830 is verified, the memory controller 855 verifies a signature 841 of the second certificate 840 using a public key 832 of the first certificate 830 ( ).

When the signature 841 of the second certificate 840 is verified, the memory controller 855 compares a firmware key version stored in a second certificate 874 of a firmware image stored in a memory 870 with the firmware key version 844 of the new firmware image 800 ( ).

Since the firmware key version 844 of the new firmware image 800 is the same as the firmware key version stored in the second certificate 874 of the firmware image stored in memory 870, the memory controller 855 generates a hash value for a binary of the firmware data 820 and compares it with a firmware fingerprint 843 ( ).

Since the hash value of the manipulated firmware data 820 differs from the normal firmware fingerprint 843, the memory controller 855 stops updating the firmware image 800.

Conventionally, all public keys that are used for firmware signature verification during the entire lifetime of the storage device are stored in the ROM of the storage device, and among these public keys, a public key indicated by the value stored in a one-time-programmable (OTP) memory is selected and used for firmware signature verification. Therefore, there is a restriction that it is dependent on the hardware of the OTP memory, and the number of public keys stored in the ROM can be changed and used.

However, according to an embodiment, one public key is stored in the ROM of the storage device and used, even though the private key used to generate the firmware signature may have leaked, replacement of the public key is not required, and a separate OTP memory is also not required.

According to an embodiment, although the secret key used to generate the firmware signature has leaked, firmware updates of the storage device using the manipulated firmware image can be prevented by including information, such as firmware fingerprint and firmware key version information, that verifies the firmware image in the plurality of certificates.

According to an embodiment, when the firmware fingerprint is manipulated, verification of the second certificate fails, and thus the firmware update of the storage device using the manipulated firmware image can be prevented.

Figure 9:
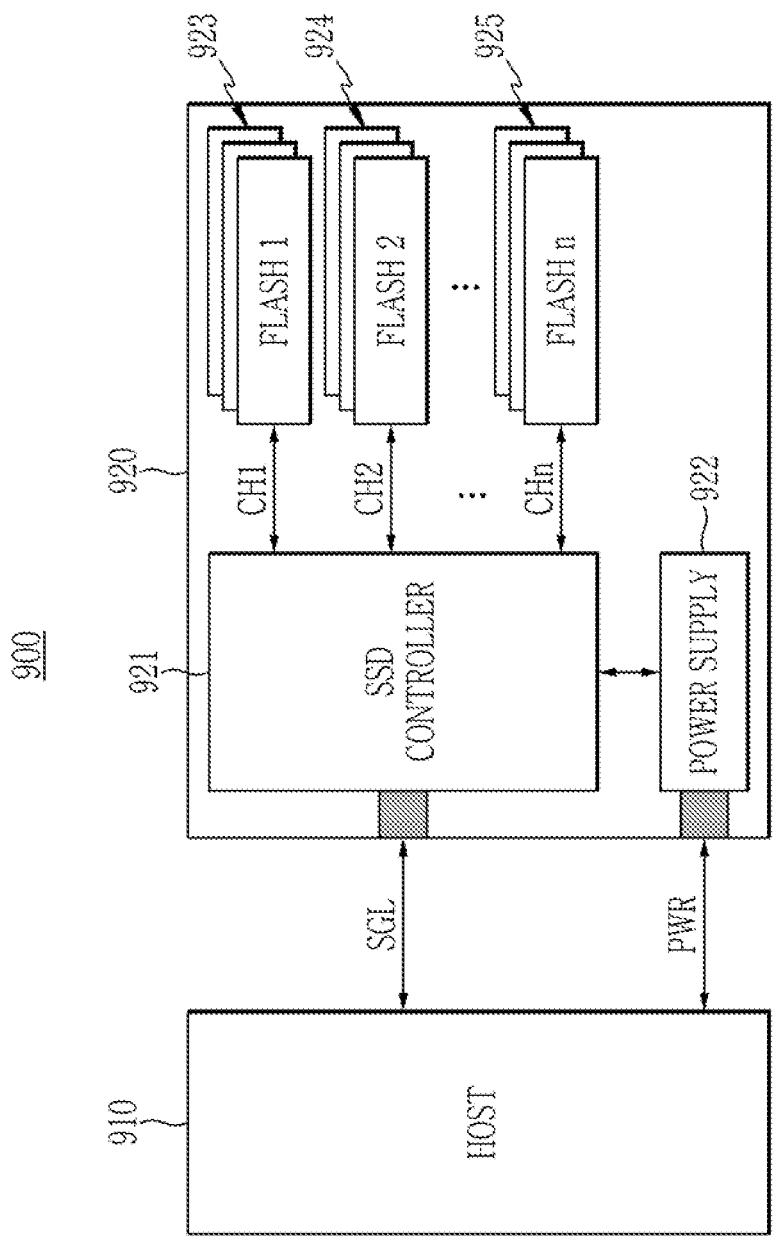
FIG. 9 is a block diagram of a storage device according to the embodiment that is incorporated into a solid-state drive (SSD) system.

FIG. 9 is a block diagram of a storage device according to an embodiment that has been incorporated into a solid-state drive (SSD) system.

Referring to FIG. 9, an SSD system 900 includes a host 910 and an SSD 920.

The SSD 920 can be implemented using embodiments described with reference to FIG. 1 to FIG. 8. The SSD 920 transmits and receive signals to and from the host 910 through a signal connector SGL, and receives power through a power connector PWR.

The SSD 920 receives a firmware image download command and a firmware image to be downloaded through the signal connector SGL.

The SSD 920 includes a controller 921, an auxiliary power supply 922, and a plurality of memory systems 923, 924, and 925. Each of the plurality of memory systems 923, 924, and 925 includes at least one flash memory device as a storage device. In addition, each flash memory device includes at least one die, and at least one block may be disposed in each die.

The controller 921 communicates with a plurality of memory systems 923, 924, and 925 through a plurality of channels Ch1 to Chn. The controller 921 verifies the firmware image in the SSD 920 and performs an update operation based on the firmware image.

While embodiments of the disclosure have been described in connection with the drawings, it is to be understood that embodiments of the disclosure are not limited thereto. On the contrary, it is intended to cover various modifications and equivalent arrangements included within the spirit and scope of the appended claims.

What is claimed is:

1. A storage device, comprising:
a memory that includes a firmware image area; and
a memory controller that
receives a first firmware image that includes a firmware signature, firmware data, a first certificate that includes a first certificate public key and a firmware fingerprint, and a second certificate that includes a second certificate public key,
verifies the first certificate using the second certificate public key,
compares a hash value of the firmware data with the firmware fingerprint when the first certificate is verified,
verifies the firmware signature using the first certificate public key when the hash value of the firmware data matches the firmware fingerprint, and
stores the first firmware image in the firmware image area when the firmware signature is verified.

2. The storage device of claim 1, wherein
the memory controller determines that the first firmware image has been manipulated when the hash value of the firmware data does not match the firmware fingerprint.

3. The storage device of claim 1, wherein
the firmware image area stores a second firmware image of the storage device,
the second firmware image and the first firmware image each contain firmware key version information, and
the memory controller compares the hash value of the firmware data of the first firmware image with the firmware fingerprint of the first firmware image when a firmware key version of the first firmware image is greater than or equal to a firmware key version of the second firmware image.

4. The storage device of claim 3, wherein
the memory controller determines that a version of the first firmware image is lower than a version of the second firmware image when the firmware key version of the first firmware image is lower than the firmware key version of the second firmware image.

5. The storage device of claim 3, wherein
the memory controller compares the firmware key version of each of the second firmware image and the first firmware image when the first certificate is verified.

6. The storage device of claim 5, further comprising a ROM that stores a public key,
wherein the memory controller verifies the second certificate using the public key stored in the ROM, and verifies the first certificate when the second certificate is verified.

7. The storage device of claim 6, wherein
the first certificate includes a signature of the first certificate,
the second certificate includes a signature of the second certificate, and
the signature of the first certificate and the signature of the second certificate are generated with a same private key.

8. The storage device of claim 7, wherein
the memory controller verifies the signature of the second certificate using the public key stored in the ROM.

9. The storage device of claim 7, wherein
the memory controller verifies the signature of the first certificate using a public key of the second certificate.

10. A method of updating firmware of a storage device, comprising:
receiving from a host a first firmware image that includes a firmware signature, firmware data, and a first certificate that includes a first certificate public key and a firmware fingerprint;
obtaining a hash value by applying a hash function to the firmware data;
comparing whether the hash value matches the firmware fingerprint;
verifying the firmware signature using the first certificate public key when the hash value of the firmware data matches the firmware fingerprint; and
storing the first firmware image in a firmware image area when the firmware signature is verified.

11. The method of claim 10, further comprising:
determining that the first firmware image has been manipulated when the hash value of the firmware data does not match the firmware fingerprint.

12. The method of claim 10, further comprising:
comparing a firmware key version of the first firmware image with a firmware key version of a second firmware image stored in the firmware image area of the storage device,
wherein obtaining the hash value is performed when the firmware key version of the first firmware image is higher than a firmware key version of the second firmware image.

13. The method of claim 12, further comprising:
determining that the firmware key version of the first firmware image is lower than the firmware key version of the second firmware image when the firmware key version of the first firmware image is lower than the firmware key version of the second firmware image.

14. The method of claim 12, wherein
the first firmware image further comprises a second certificate that includes a second certificate public key, and
the method further comprises verifying the first certificate using the second certificate public key, and
comparing the firmware key version of the first firmware image with the firmware key version of the second firmware image is performed when the first certificate is verified.

15. The method of claim 14, further comprising:
verifying the second certificate using a public key stored in a ROM of the storage device,
wherein verifying the first certificate is performed when the second certificate is verified.

16. The method of claim 15, wherein
the first certificate includes a signature of the first certificate,
the second certificate includes a signature of the second certificate, and
the signature of the first certificate and the signature of the second certificate are generated with a same private key.

17. The method of claim 16, wherein
verifying the second certificate comprises verifying the signature of the second certificate using a public key stored in the ROM.

18. The method of claim 16, wherein
verifying the first certificate comprises verifying the signature of the first certificate using the second certificate public key.

19. A storage device, comprising:
a plurality of memory systems; and
a controller that
  controls the plurality of memory systems,
  receives a firmware image that includes firmware data and a firmware fingerprint from a host through a signal connector, and
  reports to the host that the firmware image has been manipulated when a hash value of the firmware data does not match the firmware fingerprint.

20. The storage device of claim 19, wherein
the firmware image comprises a signature of a certificate based on the firmware fingerprint, and
the controller reports to the host that the firmware image has been manipulated when a hash value of the firmware fingerprint does not match a hash value of a decrypted signature of the certificate.

* * * * *